United States Patent
Thompson et al.

(10) Patent No.: US 9,639,186 B2
(45) Date of Patent: May 2, 2017

(54) MULTI-TOUCH INTERFACE GESTURES FOR KEYBOARD AND/OR MOUSE INPUTS

(75) Inventors: Robert Lee Thompson, San Francisco, CA (US); Xueliang Hua, Bejing (CN); Zheng Zhang, Beijing (CN); Juan Casares, Mountain View, CA (US); Wenlong Shao, Beijing (CN); Li-Zhu Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 1218 days.

(21) Appl. No.: 13/362,854

(22) Filed: Jan. 31, 2012

(65) Prior Publication Data

US 2012/0127206 A1    May 24, 2012

Related U.S. Application Data

(63) Continuation of application No. 12/871,639, filed on Aug. 30, 2010, now Pat. No. 9,465,457.

(51) Int. Cl.
*G06F 3/0488* (2013.01)
*G06F 3/038* (2013.01)

(52) U.S. Cl.
CPC .......... *G06F 3/038* (2013.01); *G06F 3/04883* (2013.01); *G06F 2203/0383* (2013.01); *G06F 2203/04805* (2013.01); *G06F 2203/04808* (2013.01)

(58) Field of Classification Search
CPC ........................ G06F 3/04812; G06F 3/04883
See application file for complete search history.

(56) References Cited

U.S. PATENT DOCUMENTS

| | | |
|---|---|---|
| 5,621,871 A | 4/1997 | Jaremko et al. |
| 6,204,845 B1 | 3/2001 | Bates et al. |
| 6,396,523 B1 | 5/2002 | Segal et al. |
| 6,791,536 B2 | 9/2004 | Keely et al. |
| 7,254,775 B2 | 8/2007 | Geaghan et al. |
| 7,730,401 B2 | 6/2010 | Gillespie et al. |
| 7,802,202 B2 | 9/2010 | Fox et al. |
| 8,754,855 B2 | 6/2014 | Duncan et al. |
| 2002/0075164 A1 | 6/2002 | Iizuka et al. |
| 2002/0085038 A1 | 7/2002 | Cobbley et al. |
| 2002/0089541 A1 | 7/2002 | Orbanes et al. |
| 2004/0021681 A1 | 2/2004 | Liao |
| 2004/0260764 A1* | 12/2004 | Witchel ........................ 709/202 |

(Continued)

FOREIGN PATENT DOCUMENTS

WO    2007037806 A1    4/2007

OTHER PUBLICATIONS

Final Office Action dated Jul. 23, 2015, U.S. Appl. No. 12/871,639, filed Aug. 30, 2010, 10 pages.

(Continued)

*Primary Examiner* — Ryan Pitaro

(57) ABSTRACT

A mouse-and-keyboard based user interface is updated based on gestures made on a touch screen that is displaying the mouse-and-keyboard based user interface. The user interface update process includes the steps of receiving one or more touch events in response to a gesture made on the touch screen, translating the touch events to a mouse-and-keyboard based command, transmitting the mouse-and-keyboard based command to an operating system, and receiving an updated display in response thereto.

12 Claims, 14 Drawing Sheets

(56) References Cited

U.S. PATENT DOCUMENTS

| | | |
|---|---|---|
| 2005/0022130 A1 | 1/2005 | Fabritius |
| 2006/0085767 A1 | 4/2006 | Hinckley et al. |
| 2006/0129933 A1 | 6/2006 | Land et al. |
| 2006/0161871 A1 | 7/2006 | Hotelling et al. |
| 2006/0253797 A1 | 11/2006 | Madan et al. |
| 2007/0257891 A1* | 11/2007 | Esenther et al. ............ 345/173 |
| 2007/0271513 A1 | 11/2007 | Andren |
| 2008/0016468 A1 | 1/2008 | Chambers et al. |
| 2008/0062202 A1 | 3/2008 | Schulz et al. |
| 2009/0275406 A1 | 11/2009 | Bytnar et al. |
| 2009/0327975 A1* | 12/2009 | Stedman ............... G06F 3/0416 715/863 |
| 2010/0177035 A1 | 7/2010 | Schowengerdt et al. |
| 2010/0235729 A1 | 9/2010 | Kocienda et al. |
| 2010/0235734 A1* | 9/2010 | Ording et al. ................ 715/702 |
| 2010/0281374 A1 | 11/2010 | Schulz et al. |
| 2011/0078614 A1 | 3/2011 | Lee et al. |
| 2011/0126135 A1 | 5/2011 | Chambers et al. |
| 2011/0167351 A1 | 7/2011 | Arora et al. |
| 2011/0234503 A1 | 9/2011 | Fitzmaurice et al. |
| 2011/0296333 A1 | 12/2011 | Bateman et al. |
| 2011/0314093 A1 | 12/2011 | Sheu et al. |
| 2012/0200571 A1 | 8/2012 | Newell |
| 2012/0242581 A1* | 9/2012 | Laubach ............. G06F 3/04812 345/168 |
| 2012/0293440 A1 | 11/2012 | Hotelling et al. |
| 2013/0212541 A1 | 8/2013 | Dolenc et al. |

OTHER PUBLICATIONS

Fox, Tedd, "Citrix Receiver for iPad—Demo 2—Bring up or activating the keyboard in a session", Apr. 23, 2010, pp. 1-3, available at URL: http://blogs.citrix.com/2010/04/23/citrix-receiver-for-ipad-demo-2-bring-up-or-activating-the-keyboard-in-a-session/.

* cited by examiner

MULTI-TOUCH INTERFACE GESTURES FOR KEYBOARD AND/OR MOUSE INPUTS

CROSS-REFERENCE TO RELATED APPLICATION(S)

This application is a continuation-in-part of U.S. patent application Ser. No. 12/871,639, filed Aug. 30, 2010, the entire contents of which are incorporated by reference herein.

BACKGROUND

User interfaces (UIs) for software programs are often designed to include UI elements that are easily selectable using mouse and/or keyboard input devices. However, the evolution of computer hardware has introduced several new input devices, including multi-touch display surfaces seen on smart phones and tablet personal computers (PCs). Though these multi-touch display surfaces are favorable in many aspects when interacting with multi-touch based UIs (which include large UI elements that are easy to select using one or more fingertips), the same does not apply when interacting with mouse-and-keyboard based UIs, which may be generated for display to the user on his or her computing device when the user is remotely accessing or running locally an application that is configured for mouse-and-keyboard based commands.

When the user is remotely accessing an application that is configured for mouse-and-keyboard based commands, the user controls a particular "host" machine remotely from his or her computing device. This type of interaction is commonly referred to as a "remoting" session. In typical remoting sessions, the user's computing device comprises input/output (IO) hardware that is similar to that of the host machine, such as a keyboard, a mouse, and a monitor. Throughout a remoting session, the video output data at the host machine is routed to the user's computing device, where such video data often includes a user interface (UI) of an operating system executing on the host machine. Conversely, user input data received at the user's computing device is routed to the host machine, where the host machine interprets the routed input data as if the input data was received locally at the host machine. For example, the user could select, using a mouse of his or her computing device, an executable (.exe) file of a software program located in a folder that is displayed within the UI of the host machine. In this example, the mouse command is routed from the remote machine to the host machine, where the mouse command causes the host machine to execute the selected software program. Then, the host machine routes new video data (which displays a UI of the executed software program) back to the remote machine.

However, if the user's computing device that is carrying out the remoting session does not employ a mouse and a keyboard but instead relies on a multi-touch display surface for receiving user inputs, user navigation of the UI becomes cumbersome and often results in inaccurate inputs. For example, a mouse click on a mouse-and-keyboard based UI specifies a particular (x, y) coordinate of the UI on which a cursor associated with the mouse currently lies. In contrast, tapping a finger to a multi-touch display surface implicates a plurality of (x, y) coordinates of the UI on which the tap is placed. Thus, when navigating a mouse-and-keyboard based UI using a finger, an approximation of the plurality of (x, y) coordinates into a single (x, y) coordinate is continually required. These approximations often lead to input inaccuracies, thereby reducing the overall productivity of the user when the user is remoting into or running locally an application that is configured for mouse-and-keyboard based commands.

Several modifications in UI design have been attempted to improve input accuracy in such situations. For example, the ability to zoom-in and zoom-out on a UI allows a user to interact more efficiently with any small interface elements included therein. However, such a UI technique requires that the user continually zooms-in and zooms-out on the UI, which is very time-consuming and represents a patchwork solution at best.

SUMMARY

Described herein are enhanced techniques for interacting with a mouse-and-keyboard based UI using a multi-touch display surface. The mouse-and-keyboard based UI may be generated for display on a user's computing device having the multi-touch display surface in connection with a remoting session or by an application running locally in the computing device.

The mouse-and-keyboard based UI may be interacted with by receiving one or more touch events in response to a gesture made on the touch display surface, translating the multi-touch events to a mouse-and-keyboard based command, and transmitting the mouse-and-keyboard based command to an operating system. The user device may thereafter receive updated display information in response thereto, and update the display accordingly.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

Figure 1A:
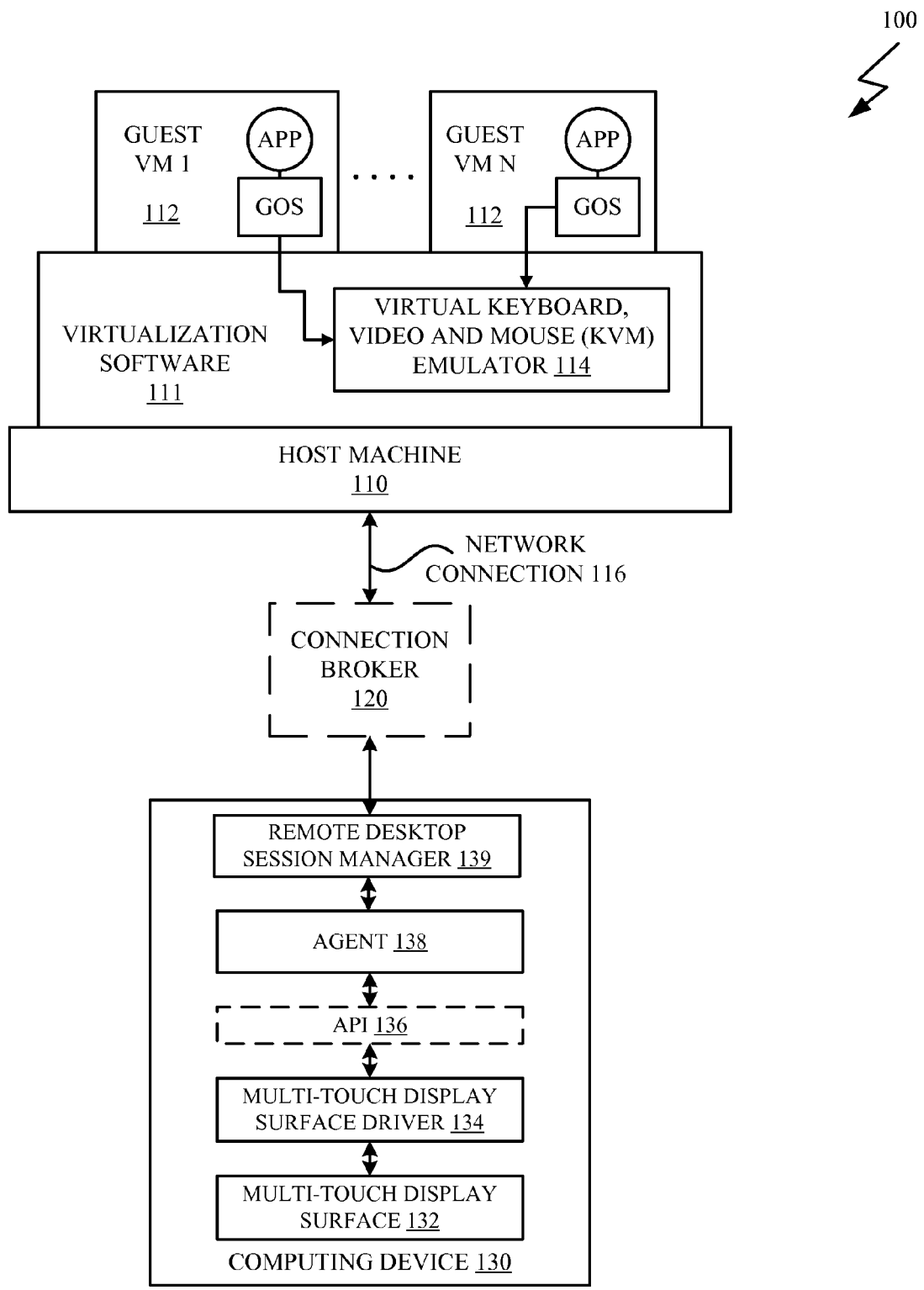
FIG. 1A is a conceptual diagram of a remoting session that shows by way of example a computing device connected through a network to a host machine.

FIG. 1A is a conceptual diagram 100 of a remoting session that shows by way of example a host machine 110 connected through a network 120 to a computing device 130. The host machine 110 may comprise a general purpose computer system having one or more applications, virtual machines, or other entities. In one embodiment, the host machine 110 comprises a virtualized computer system wherein each guest VM 112 is a virtual machine (VM) implemented by virtualization software 111, or a component thereof. Virtualization software 111 may be implemented as one or more layers of software logically interposed between and interfacing with guest VMs 112 and the physical hardware of host machine 110. In one embodiment, virtualization software 111 comprises a virtualization kernel (not shown) for managing physical resources and a virtual machine monitor (VMM) (not shown) for each guest VM 112 for emulating hardware and devices with which software within guest VM 112 interacts. In another embodiment, virtualization software includes a host operating system (not shown) for managing physical resources. These and other virtualization configurations are well known in the field of computer virtualization. Any number N of guest VMs 112 may execute concurrently on host machine 110 using virtualization software 111, the number N being limited only by physical resources such as memory and processing bandwidth. A virtual keyboard, video, and mouse (KVM) emulator 114, implements, for a particular one of guest VMs 112, virtual user interface devices and communicates user inputs and system outputs (such as display and audio information) to remote computing device 130.

Each guest VM may include a guest operating system (GOS) and one or more applications (APP). The guest operating systems may be a commodity operating system such as Microsoft Windows® or a specialized operating system designed specifically to work with virtualization software 111 (sometimes referred to as a "paravirtualized OS"). In one embodiment, virtualization software 111 is stored on a physical data storage medium (not shown) forming part of host machine 110, whereas virtual disks (not shown) for each guest virtual machine are mapped by virtualization software 111 to files that may be stored remotely or locally.

Network 120 may be a wide area network, a local area network, a wireless network, or some combination. Computing device 130 communicates with host machine 110 using the network 120 such that IO data may be communicated between computing device 130 and host machine 110. An optional connection broker 120 may be disposed between computing device 130 and host machine 110 to, for example, facilitate enhanced authentication and security features and/or provide simplified or customized connectivity options.

Computing device 130 may execute an agent 138 that is configured to facilitate a remoting session with one of guest VMs 112. Computing device 130, which may not have a mouse or keyboard attached, is configured to provide mouse-and-keyboard based commands to an application designed to accept such commands. The application may execute remotely as shown in FIG. 1A, or it may execute locally on computing device 130, e.g., a guest operating system executing in a virtual machine, as described in detail below in conjunction with FIG. 2A.

Multi-touch display surface driver 134 manages multi-touch display surface 132 included in computing device 130 and provides user input information to applications executing on computing device 130. API 136 exposes a set of functions that assist agent 138 in processing user input received via multi-touch display surface 132. For example, agent 138 may be notified via API 136 of a particular gesture-based user input occurred when a user places two of his or her fingers into contact with multi-touch display surface 132. Alternatively, agent 138 may circumvent API 136 and instead continually monitor activity of multi-touch display surface driver 134 to process user input made to multi-touch display surface 132. Agent 138 is in communication with remote desktop session manager 139, which manages the remote session between computing device 130 and a guest VM 112 executing on host machine 110.

In a remoting session, remote desktop session manager 139 receives from host machine 110 video output data generated by the guest operating system of guest VM 112 and transmits the video output data to agent 138. In turn, agent 138 issues instructions to multi-touch display surface driver 134 to display the video output data and any video overlays that are generated by agent 138, as described in further detail below. Input data is collected and processed at computing device 130 via multi-touch display surface 132, multi-touch display surface driver 134, and/or API 136, whereupon the input data is translated into mouse and/or keyboard commands by agent 138 and transmitted host machine 110 via remote desktop session manager 139. Upon receipt, virtualization software 111 passes the user inputs to virtual keyboard, video, and mouse emulator 114, which injects the user inputs into the corresponding guest VM 112 using appropriate device drivers that are installed into the guest operating system. Display updates from guest VM 112 are received by virtual keyboard, video and mouse emulator 114 and translated into an appropriate desktop remoting protocol and sent to computing device 130 to update the display thereon.

Figure 1B:
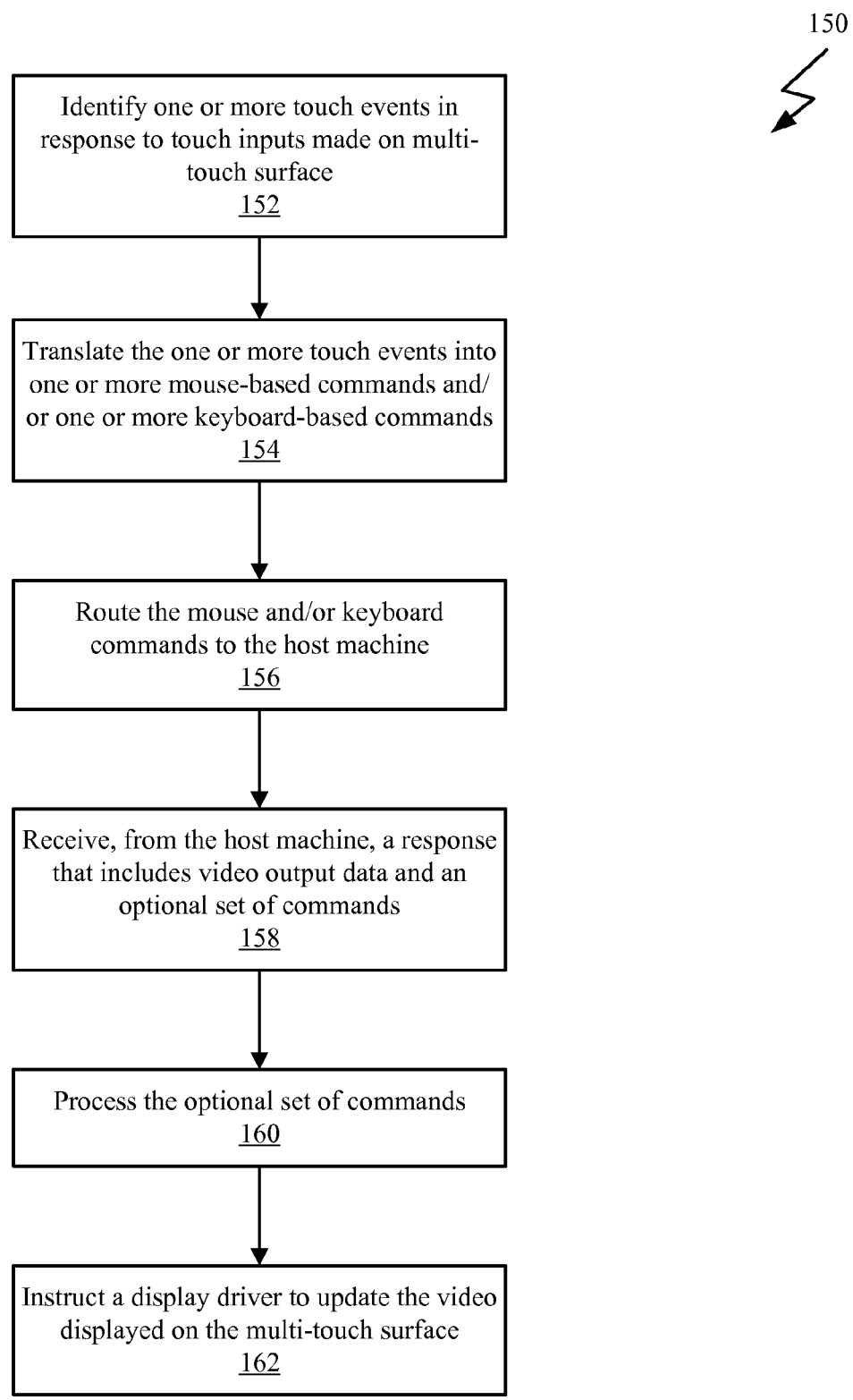
FIG. 1B is a flow diagram of method steps carried out by the computing device of FIG. 1A for translating multi-touch events into mouse and/or keyboard commands.

FIG. 1B is a flow diagram of an exemplary method 150 for transmitting and receiving remoting data between a multi-touch based remote machine and a mouse-and-keyboard based host machine, according to one embodiment of the present invention.

Figure 4A:
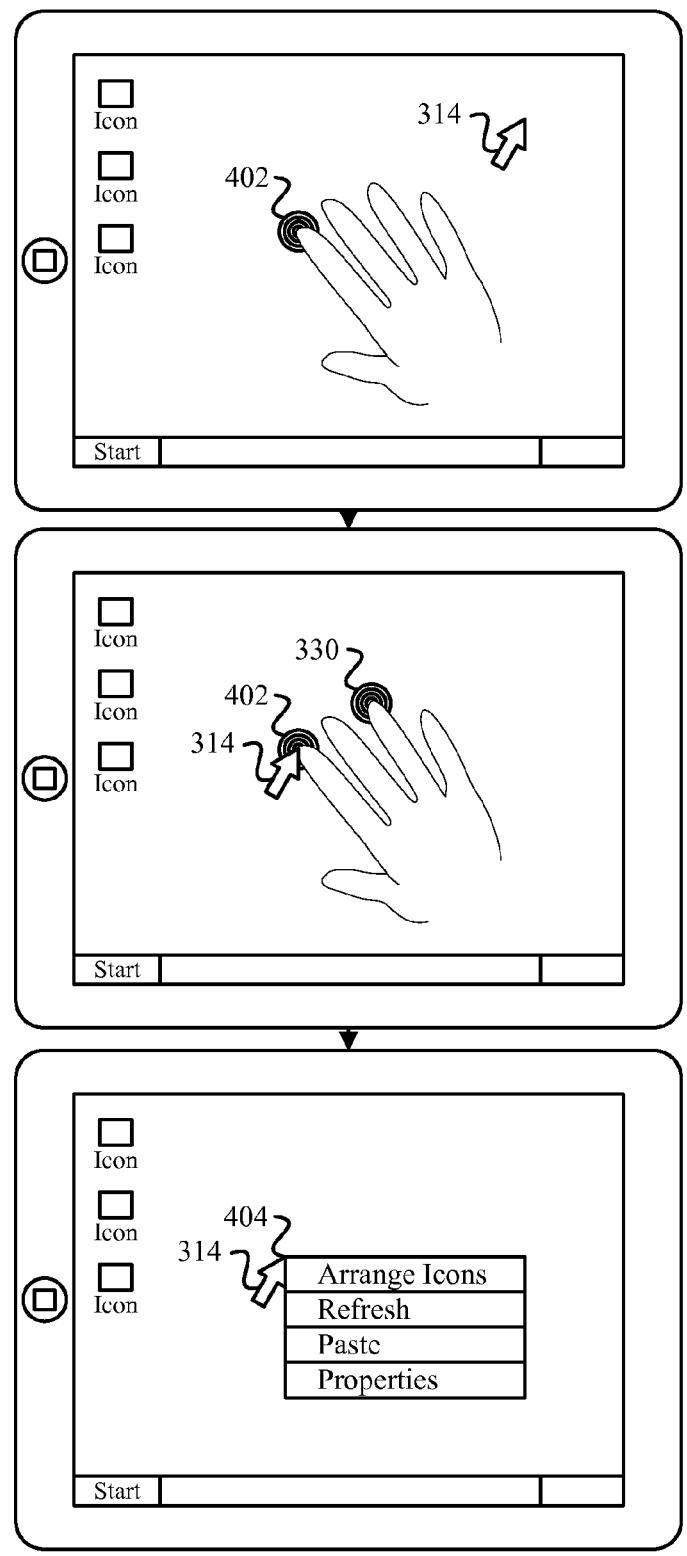
FIG. 4A is a conceptual diagram of a method for establishing a mouse right-click using a multi-touch display surface.
Figure 4B:
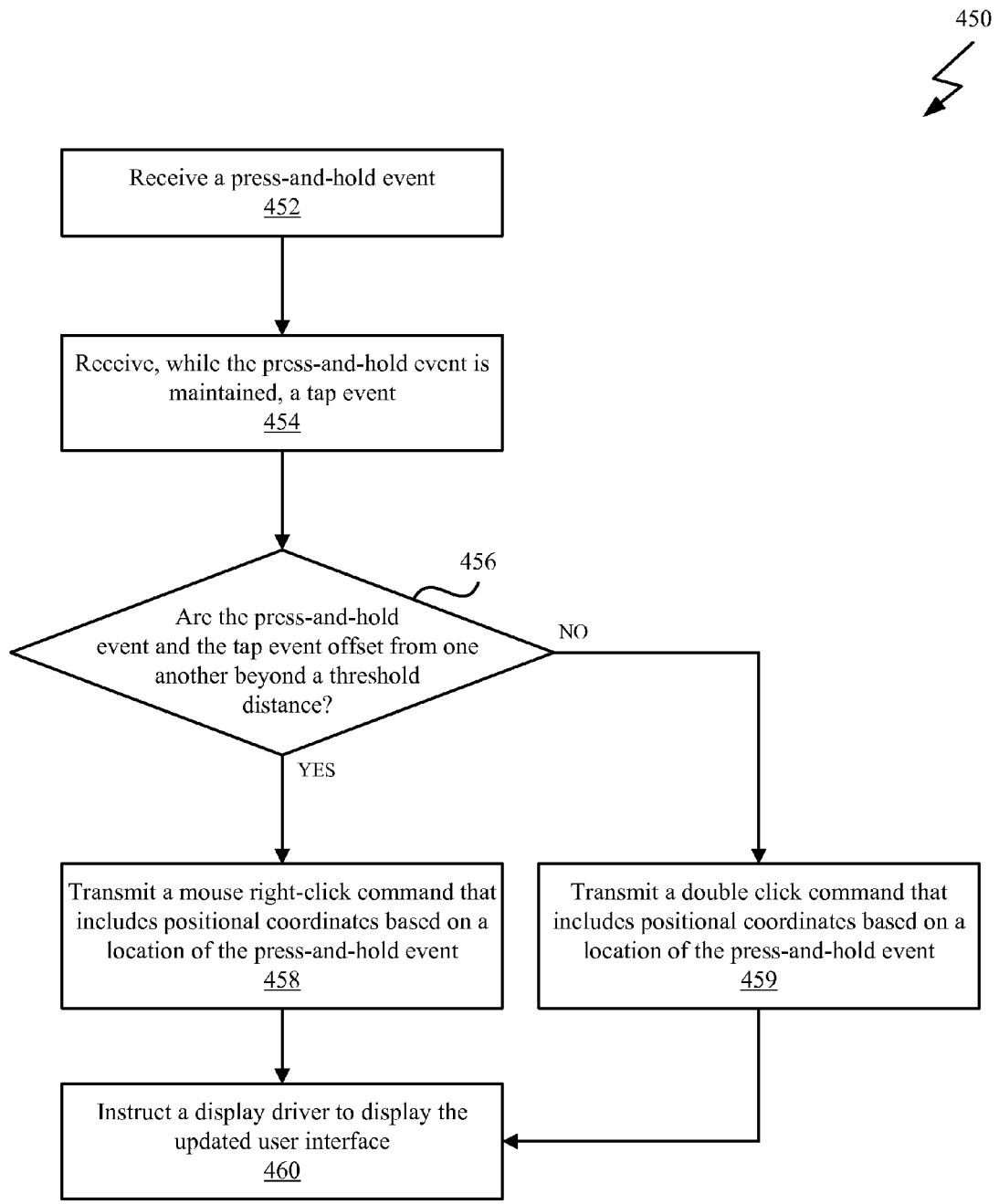
FIG. 4B is a flow diagram of method steps for establishing a mouse right-click using a multi-touch display surface.

The method 150 begins at step 152, where agent 138 identifies one or more touch events in response to touch inputs made on multi-touch display surface 132. At step 154, agent 138 translates the one or more touch events into one or more mouse-based commands and/or one or more keyboard-based commands. In one embodiment, agent 138 maintains a database in computing device 130 that associates one or more predefined touch events with a corresponding mouse-based command and/or keyboard based command. For example, two touch events that imply a mouse right-click, as described below in conjunction with FIGS. 4A-4B are associated with a mouse-right click command.

At step 156, agent 138 routes the mouse and/or keyboard commands to the host machine 110. As described herein, agent 138 communicates with host machine 110 using network 116, and may route such mouse and/or keyboard commands by including each in network packets that are addressed to host machine 110.

At step 158, agent 138 receives, from host machine 110, a response that includes video output data and an optional set of commands. In one embodiment, host machine 110 is configured to only output video data only when host machine 110 transmits updated video output data, thereby reducing the amount of data transmitted over network 116 and resultantly increasing bandwidth.

At step 160, agent 138 processes the optional set of commands. In one embodiment, the optional set of commands cause agent 138 to perform specific tasks. For example, if the user selects a text input field located in a window UI included in, e.g., UI 308 described below in conjunction with FIG. 3, host machine 110 may include this information in the optional set of commands. Upon receipt of the optional set of commands, agent 138 would automatically initialize and display virtual keyboard 708 described below in conjunction with FIGS. 6A-6B so that the user could easily provide textual input to the text input field.

At step 162, agent 138 instructs multi-touch display surface driver 134 to update the video displayed on computing device 130. In the example described above in step 160, agent 138 would instruct multi-touch display surface driver 134 to overlay virtual keyboard 708 onto a most up-to-date UI 308.

Figure 2A:
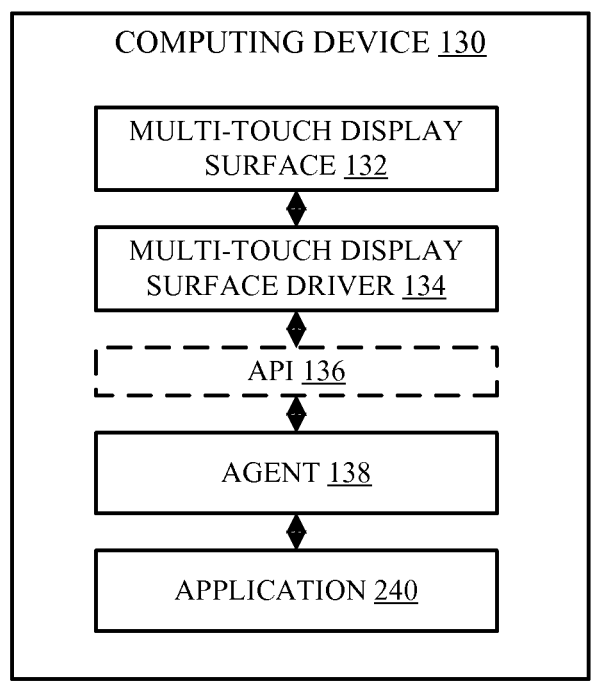
FIG. 2A is a conceptual diagram showing components of a computing device that are used in translating multi-touch interface gestures to keyboard and/or mouse commands.

FIG. 2A is a conceptual diagram of a mouse and keyboard-based application under control of computing device 130. In this embodiment, mouse-and-keyboard based application 240, which may be a virtual machine hosting a commodity operating system, is running locally on computing device 130, and is in communication with agent 138. As described above, agent 138 interacts with API 136 and/or multi-touch display surface driver 134 to manage user input received via multi-touch display surface 132 included in computing device 130. The user input data collected by multi-touch display surface driver 134 and/or API 136 is processed and translated by agent 138 into mouse and keyboard commands that are transmitted to application 240 to emulate user input that is normally made to application 240 via a physical mouse and/or keyboard. In turn, application 240 transmits an updated user interface to agent 138, which issues instructions to multi-touch display surface driver 134 to display the updated interface and any video overlays generated by agent 138.

Figure 2B:
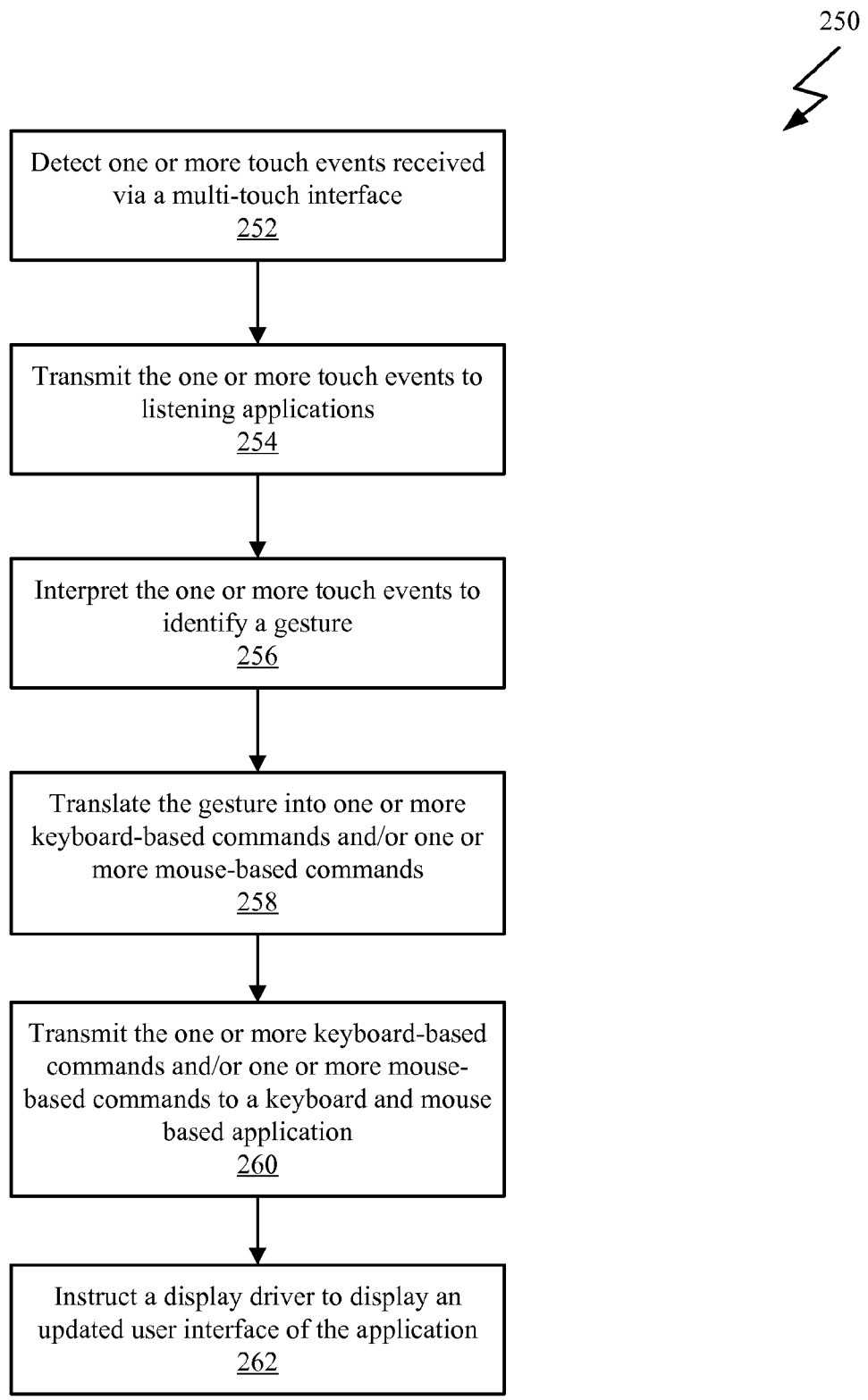
FIG. 2B is a flow diagram of method steps carried out by the computing device of FIG. 2A for translating multi-touch events into mouse and/or keyboard commands.

FIG. 2B is a flow diagram of method steps 250 for translating multi-touch events into mouse and/or keyboard commands, according to one embodiment of the present invention. As shown, method 250 begins at step 252, where multi-touch display surface driver 134 detects one or more touch inputs received via multi-touch display surface 132. At step 254, multi-touch display surface driver 134 transmits, in response to the touch inputs, one or more touch events to listening applications, e.g., API 136 and agent 138.

At step 256, API 136 and/or agent 138 interprets the one or more touch events to identify a gesture. As described herein, agent 138 may work alone or in conjunction with API 136 to process user input made to multi-touch display surface 132. At step 258, agent 138 translates the gesture into one or more keyboard-based commands and/or one or more mouse-based commands, as described herein.

At step 260, agent 138 transmits the one or more keyboard-based commands and/or the one or more mouse-based commands to a keyboard and mouse based application, such as an operating system executing on host machine 110. At step 262, agent 138 instructs multi-touch display surface driver 134 to display on multi-touch display surface 132 an updated user interface of the operating system.

Various techniques to effectively interact with a mouse-and-keyboard based UI using a multi-touch display surface are described herein. For purposes of illustration, in each of the examples described below in conjunction with FIGS. 3-7, the system of FIG. 1A in which computing device 130 has established a remoting session with a guest VM 112 executing within host machine 110 is employed. However, it should be recognized that the system of FIG. 2A may also be employed.

Figure 3:
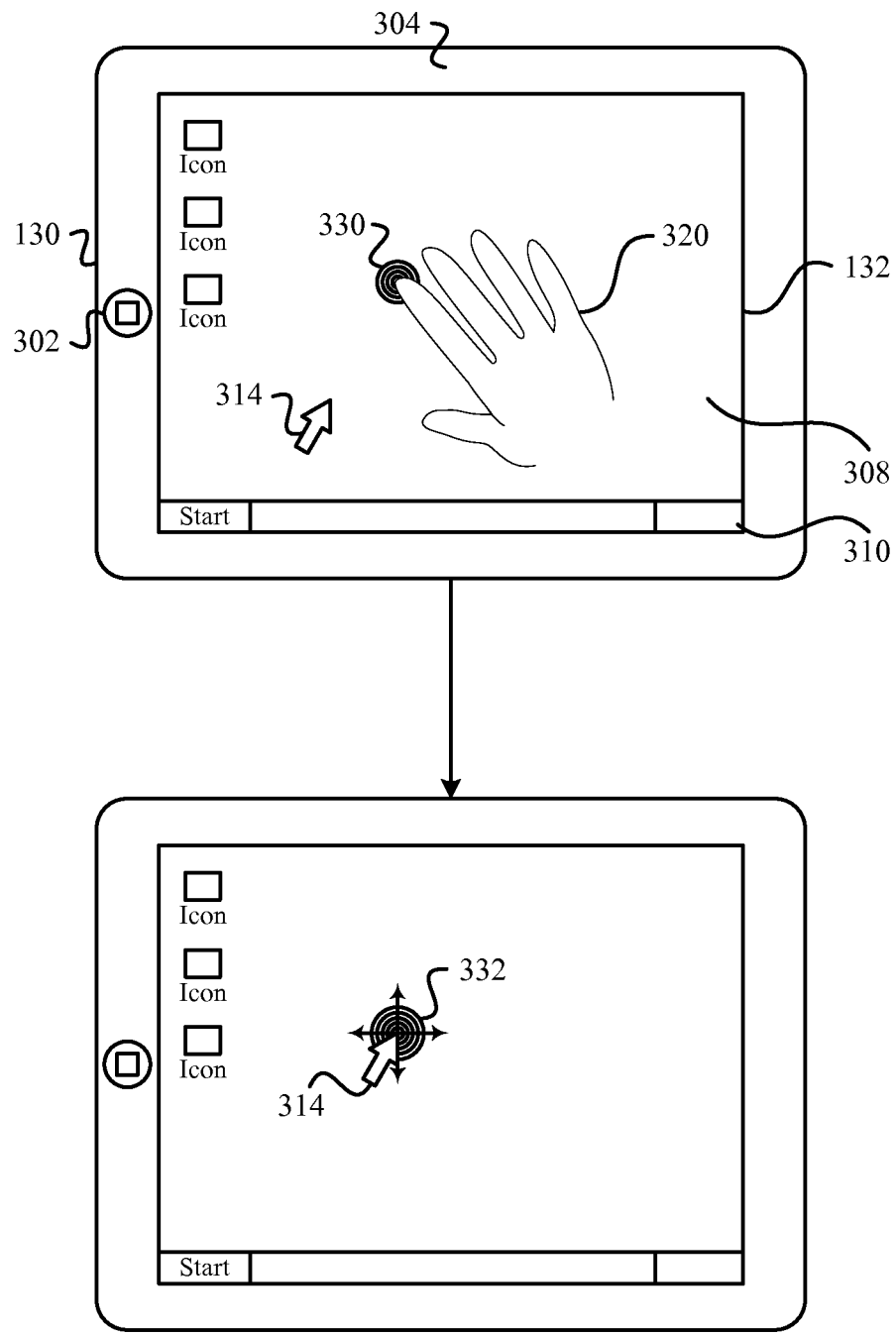
FIG. 3 is a conceptual diagram of a method for enhancing the feedback of a mouse left-click made using a multi-touch display surface, according to one embodiment of the invention.

FIG. 3 is a conceptual diagram of an exemplary method for enhancing the feedback of a mouse left-click made using a multi-touch display surface. As shown, computing device 130 includes a physical button 302, a border area 304 and multi-touch display surface 132. Border area 304 provides a separation between edges of computing device 130 and multi-touch display surface 132. Multi-touch display surface 132 displays a UI 308 of an operating system executing on host machine 110, which includes a cursor 314.

A hand 320 of a user may be used to establish contact with multi-touch display surface 132, e.g., by a tap 330 made using the index finger of hand 320. In the embodiments described herein, tap 330 comprises establishing contact between a single finger of hand 320 and multi-touch display surface 132, and then eliminating the contact within a predetermined threshold of time, e.g., 0.15 seconds. Continuing with the foregoing example, when the user presses his or her finger to the multi-touch display surface 132 for longer than the threshold time, agent 138 recognizes the user's input as a "press-and-hold" gesture, as described in further detail below in conjunction with FIGS. 4A-4B. In one embodiment, tap 330 is translated to a mouse left-click command that includes positional coordinates for a location within the graphical user interface of the remote desktop that corresponds to the location of tap 330 within UI 308. This location may be relative, as the user may zoom or pan the remote desktop display within UI 308. A tap feedback animation 332 may be displayed to the user in response to tap 330. In one embodiment, tap feedback animation 332 is a "pulse" animation that exudes circles of light from the location of the tap. However, any suitable animation technique may be used. It should be recognized that tap feedback animation 332 is generated locally by computing device 130 and overlaid, by agent 138, onto UI 308. Tap feedback animation 332—along with additional computing device based UI elements described herein—may therefore be customized independent of host machine 110.

It should be recognized that in the methods described herein, agent 138 regularly issues instructions to multi-touch display surface driver 134 that cause multi-touch display surface 132 to display an up-to-date user interface. These instructions are issued in response to user interface updates generated by a guest operating system executing on host machine 110 (or user interface updates generated by application 240 in embodiments that do not employ remoting), and/or video overlays generated by agent 138. For brevity in description, these regularly issued instructions are, for the most part, not captured in the flow diagrams of the methods described herein. They have been included in cases where they are helpful to the description of the method.

FIG. 4A is a conceptual diagram of an exemplary method for establishing a mouse right-click using a multi-touch display surface. As shown, a press-and-hold 402 is established by the user of computing device 130. In one embodiment, agent 138 identifies a press-and-hold 402 when a user's finger is in contact with multi-touch display surface 132 beyond a predetermined threshold of time, e.g., 0.5 seconds. Next, while maintaining press-and-hold 402, the user establishes tap 330 at another location. In one embodiment, agent 138 may be configured to calculate a distance between (x, y) coordinates of both press-and-hold 402 and tap 330 to determine whether press-and-hold 402 and tap 330 are nearby one another, e.g., less than a number of pixels that form a line connecting two points on the multi-touch display surface that are separated by a typical separation distance between two fingers from each other. When agent 138 recognizes the tap 330 while press-and-hold 402 is maintained, a mouse right-click command is directed from agent 138 to host machine 110, and in response thereto, host machine 110 transmits an up-to-date UI with a context menu 404 at the location of cursor 314 where press-and-hold 402 was established.

In an alternative embodiment, the user may perform a right-click command by establishing a first tap and a second tap within a selected threshold of time, e.g., 0.15 seconds. If the user establishes a first tap, but waits longer than the threshold to perform the second tap, the cursor 314 is simply relocated twice, and no mouse right-click command is recognized by agent 138 and/or host machine 110. If, however, the user establishes the first tap and the second tap within the threshold period, the second tap is translated by agent 138 into a mouse right-click command at a location of the remote desktop corresponding to the position within UI 308 at which the first tap occurred. This location may be relative, as the user may be permitted to zoom or pan the remote desktop display within UI 308.

A minimum threshold of distance is necessary to differentiate a mouse double-click and a mouse right-click. In one example, the minimum threshold distance may be twenty pixels. More specifically, if the first tap and the second tap are recognized within the predetermined threshold of time, but are close in proximity (less than the minimum threshold distance), a mouse double-click would be recognized instead of a mouse right-click. However, if the first tap and the second tap are recognized within the predetermined threshold of time, and are offset from one another by at least the minimum threshold distance, a mouse right-click would be recognized as opposed to a mouse double-click.

FIG. 4B is a flow diagram of exemplary method steps 450 for establishing a mouse right-click using a multi-touch display surface. Method 450 begins at step 452, where agent 138 receives a press-and-hold event, e.g., press-and-hold 402. At step 454, agent 138 receives, while the press-and-hold event is maintained, a tap event, e.g., tap 330. At step 456, agent 138 determines whether the press-and-hold event and the tap event are near one another, as described above. If, at step 456, agent 138 determines that the press-and-hold event and the tap event are offset from one another beyond the minimum threshold distance, then method 450 proceeds to step 458, where agent 138 transmits a mouse right-click command that includes positional coordinates based on a location of the press-and-hold event. If, at step 456, agent 138 determines that the press-and-hold event and the tap event are not offset from one another beyond the minimum threshold distance, then method 450 proceeds to step 459, where agent 138 transmits a mouse double-click command that includes positional coordinates based on a location of the press-and-hold event. At step 460, agent 138 instructs a display driver, e.g., multi-touch display surface driver 134, to display an updated user interface that includes a result of the mouse right-click command, e.g., context menu 404 displayed next to a UI item that lies beneath press-and-hold 402.

Figure 5A:
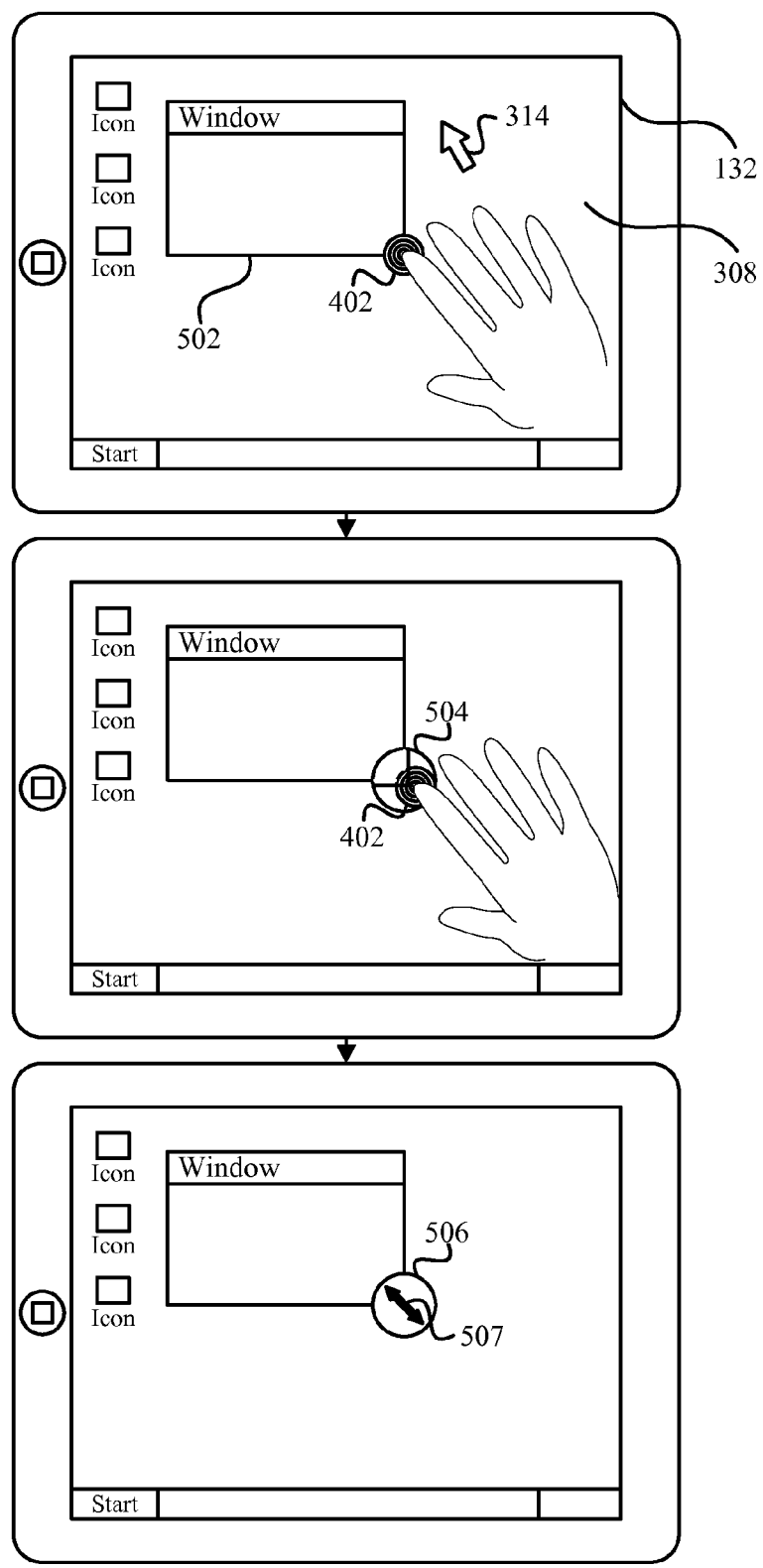
FIGS. 5A and 5B are conceptual diagrams of methods for magnifying a portion of a UI and resizing a UI window, using a multi-touch display surface.
Figure 5B:
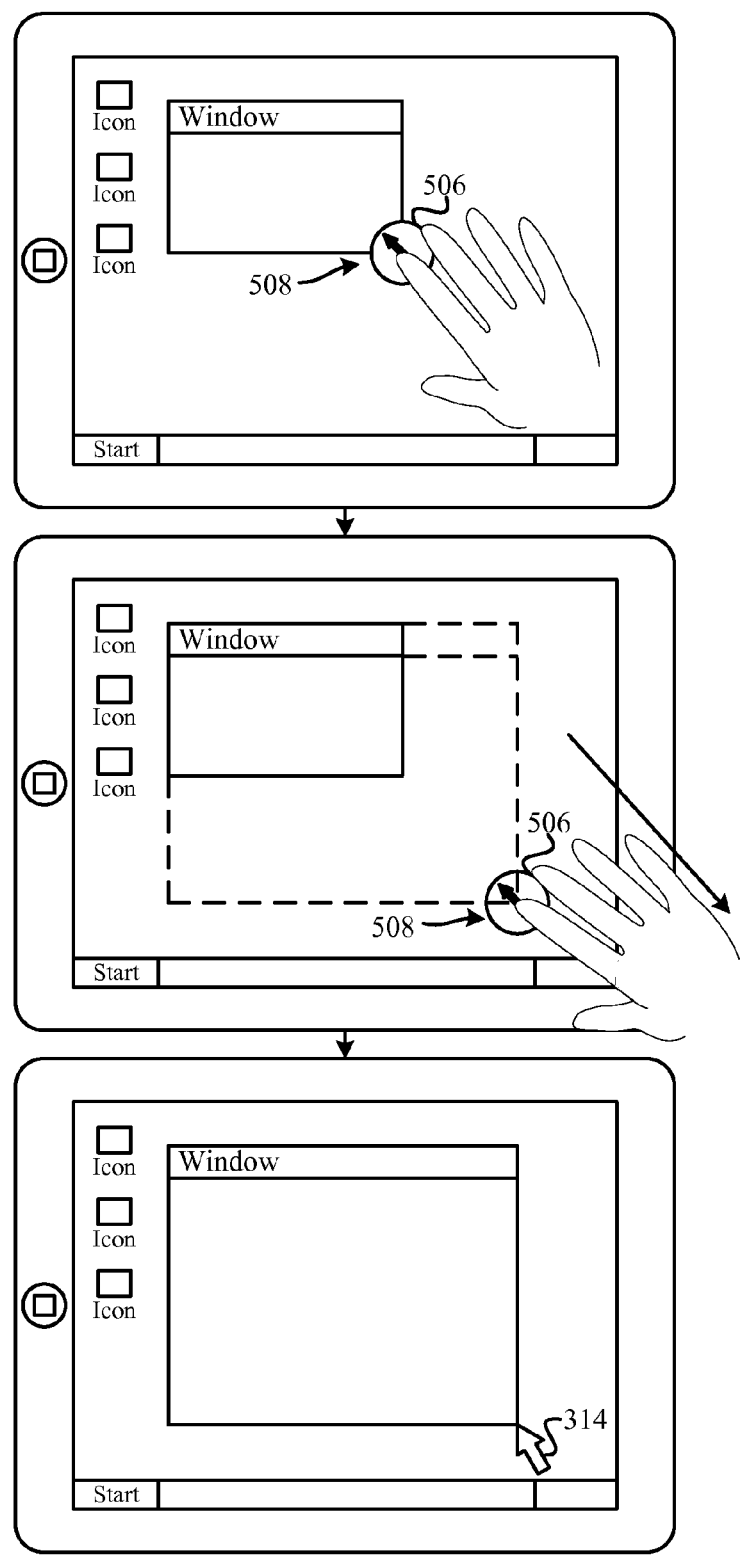

FIGS. 5A and 5B are conceptual diagrams of exemplary methods for magnifying a portion of the UI and resizing a UI window, using a multi-touch display surface. For purposes of explanation, FIG. 5A shows UI 308 displaying a remote desktop that includes a UI window 502 that is resizable by dragging a drag handle, which may be located at any corner or side of UI window 502. To magnify any portion of UI window 502, the user establishes a press-and-hold 402. As described above in conjunction with FIGS. 4A-4B, press-and-hold 402 causes a relocation of cursor 314 and a mouse down command to occur, whereupon a press-and-hold feedback animation is displayed in the same area of UI 308 to which cursor 314 is relocated. If press-and-hold 402 remains established beyond a second threshold of time, e.g., 2.0 seconds, then a loupe 504—which magnifies an area of UI 308 that loupe 504 currently covers—is displayed to the user. When loupe 504 is displayed, a mouse up command is transmitted to neutralize the mouse down command caused by the press-and-hold 402 established by the user. In this way, loupe 504 may be moved freely across multi-touch display surface 132 while agent 138 simultaneously issues mouse move commands based on location changes of the press-and-hold 402. In this way, loupe 504 assists the user in precisely locating his or her finger on UI 308. For example, if the user wants to resize UI window 502, the user will need to precisely locate loupe 504 over a corner or a side of UI window 502.

A drag handle 506 replaces loupe 504 when the user ends press-and-hold 402 while loupe 504 is displayed. Drag handle 506 represents a mouse down command issued to an (x, y) coordinate of UI 308 that lies beneath a center point 507 of drag handle 506. In addition, the user may cancel drag handle 506 by establishing contact with any portion of UI 308 that does not fall within the boundaries of drag handle 506.

Next, as shown in FIG. 5B, the user establishes a grab 508 by placing a single finger within the boundaries of drag handle 506. Grab 508 is similar to a press-and-hold 402 in that the user is required to continually maintain contact with multi-touch display surface 132. When grab 508 is established, the user is permitted to move drag handle 506 anywhere within the boundaries of UI 308. If the user moves the drag handle 506 when drag handle 506 is located on a boundary of UI window 502, a window resizing occurs as shown in FIG. 5B. When the user is satisfied with the resulting size of UI window 502, the user simply releases his or her finger from the screen, whereupon drag handle 506 is removed and a mouse up command is transmitted, and cursor 314 is reestablished at the position at which the resize ended.

Figure 5C:
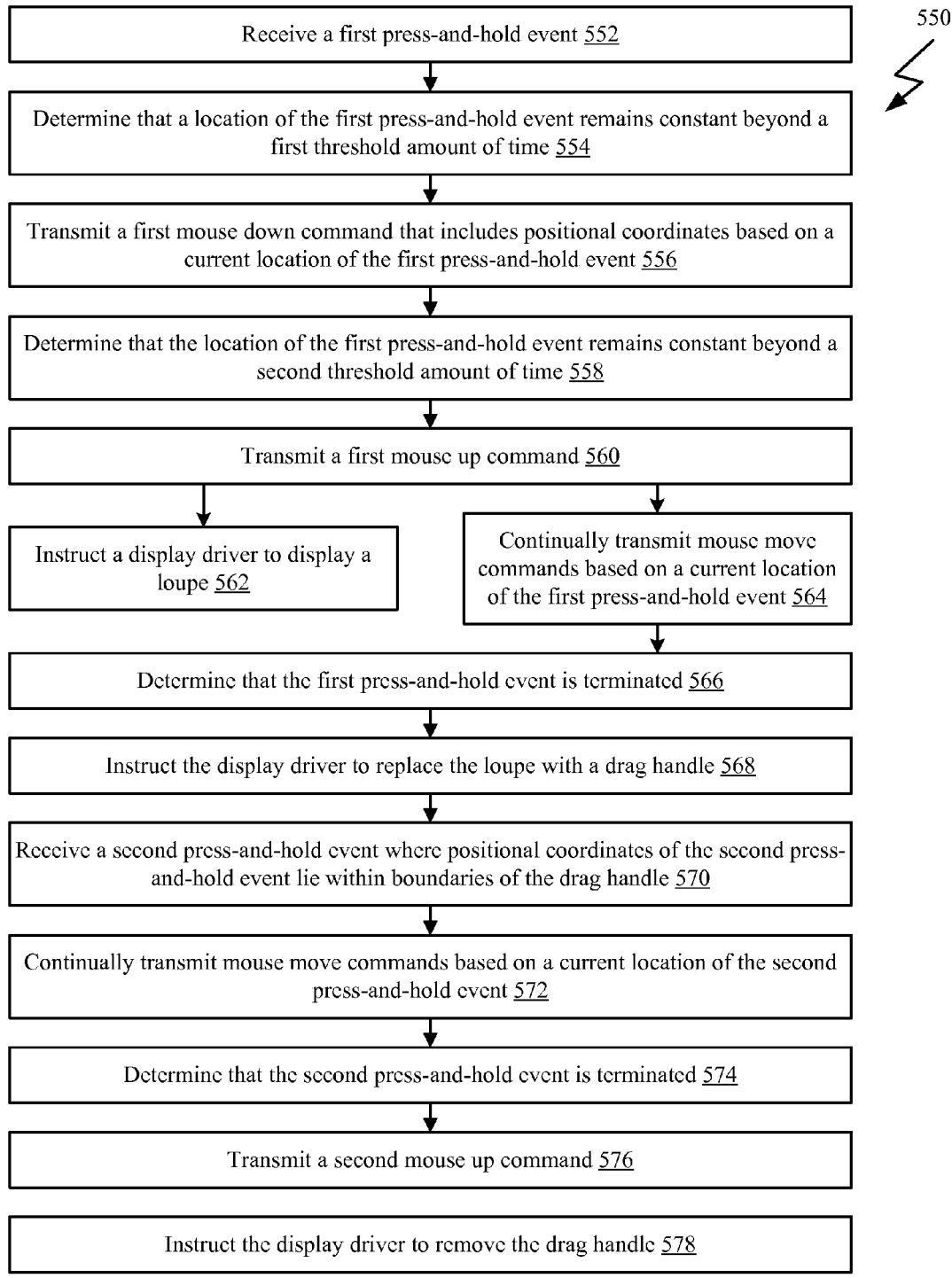
FIG. 5C is a flow diagram of method steps for magnifying a portion of a UI and resizing a UI window, using a multi-touch display surface.

FIG. 5C is a flow diagram of exemplary method steps 550 for magnifying a portion of the UI and resizing a UI window using a multi-touch display surface. Method 550 begins at step 552, where agent 138 identifies a first press-and-hold event, e.g., press-and-hold 402. At step 554, agent 138 determines that a location of the first press-and-hold event does not move, or moves very little, over a first threshold amount of time, e.g., 0.15 seconds. A first mouse down command, which includes positional coordinates based on a current location of the first press-and-hold event, is initially transmitted by agent 138 at step 556 since agent 138 does not know whether the user intends to perform a click-and-hold or to view loupe 504. At step 558, agent 138 determines that the location of the first press-and-hold event remains constant (or moves very little) beyond a second threshold amount of time, e.g., 2.0 seconds, indicating that the user wishes to enlarge a portion of UI 308 for viewing using loupe 504.

In response, at step 560, agent 138 transmits a first mouse up command to neutralize the first mouse down command transmitted in step 556, and at step 562, agent 138 overlays a loupe image on the display by issuing drawing commands to the multi-touch display surface driver 134. At step 564, agent 138 continually transmits mouse move commands based on a current location of the first press-and-hold event. As the mouse is being moved around the desktop along with loupe 504, agent 138 may receive updated cursor information from host machine 110 that indicates how the cursor should be displayed, e.g., as a resize handle for resizing a window, or as a hand, etc. At step 566, agent 138 determines that the first press-and-hold gesture is terminated, which might indicate that the user has moved his or her finger to select an item that he or she wishes to drag. At step 568, agent 138 overlays a drag handle in place of the loupe on the display at the location of the termination of the first press-and-hold gesture by sending drawing instructions to multi-touch display surface driver 134. At step 570, agent 138 receives a second press-and-hold gesture where positional coordinates of the second press-and-hold gesture lie within boundaries of the drag handle, which indicates that the user has selected the drag handle to perform a drag. At step 572, agent 138 continually transmits mouse move commands based on a current location of the second press-and-hold event, which causes the selected item to be dragged according to the movement of the user's finger. At step 574, agent 138 determines that the second press-and-hold event is terminated. At step 576, agent 138 transmits a second mouse up command, which finalizes the drag operation. At step 578, agent 138 instructs multi-touch display surface driver 134 to remove the drag handle.

Figure 6A:
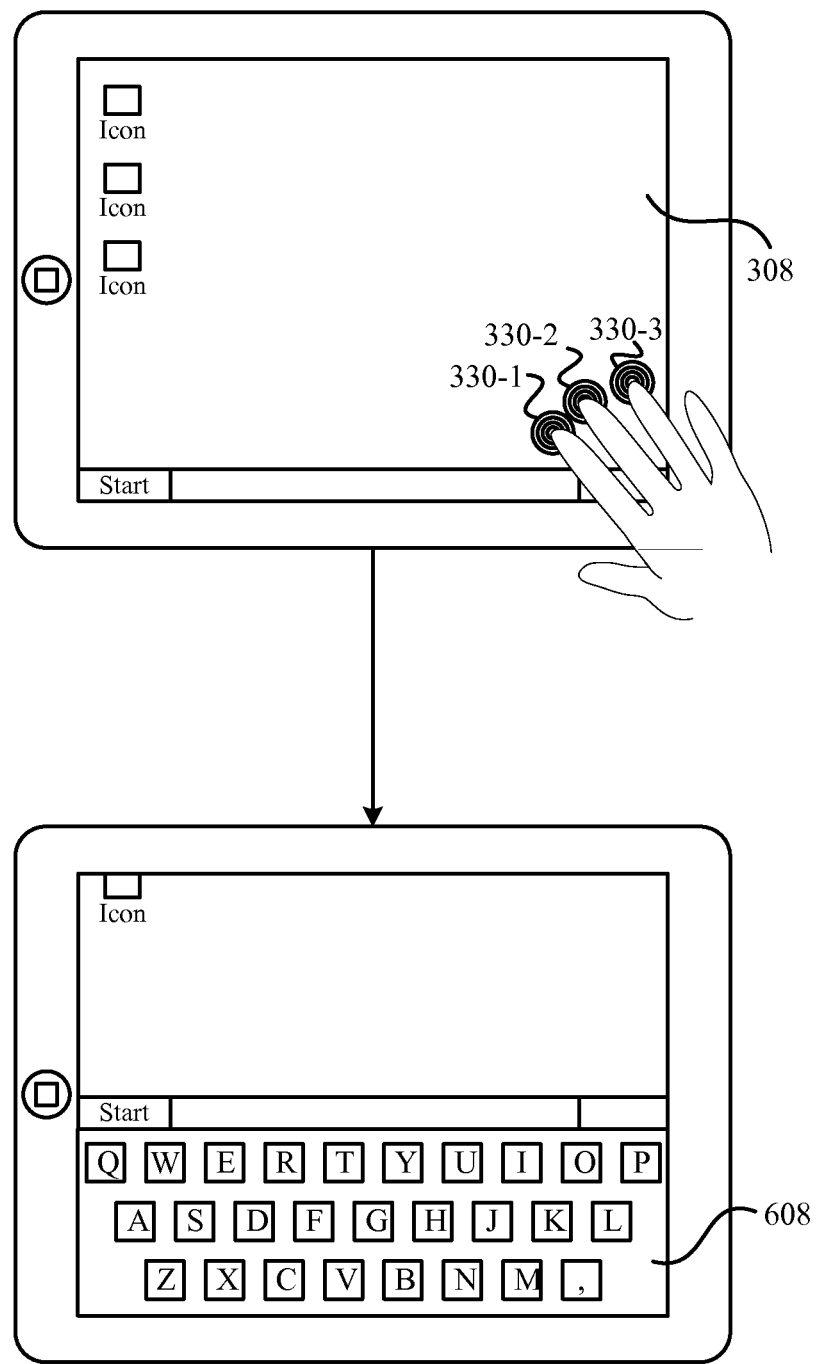
FIG. 6A is a conceptual diagram of a method for maintaining visibility of a UI when auxiliary UI elements are overlaid onto the UI.

FIG. 6A is a conceptual diagram of an exemplary method for maintaining visibility of a UI when auxiliary UI elements are overlaid onto the UI. If the user simultaneously establishes three taps 330-1, 330-2, 330-3, a virtual keyboard 608 is launched and overlaid onto UI 308. As a way to maintain visibility of a portion of the exported user interface that is of interest to the user when the three taps 330 are established, UI 308 may be panned up so that virtual keyboard 608 does not overlap the portion of the exported user interface that received the triple-tap. Such a configuration is useful when, for example, the user taps a portion of UI 308 to provide text entry. In an alternate embodiment, virtual keyboard 608 may be configured to appear at different portions of UI 308, such as the left border, and UI 308 is offset to the right accordingly.

Figure 6B:
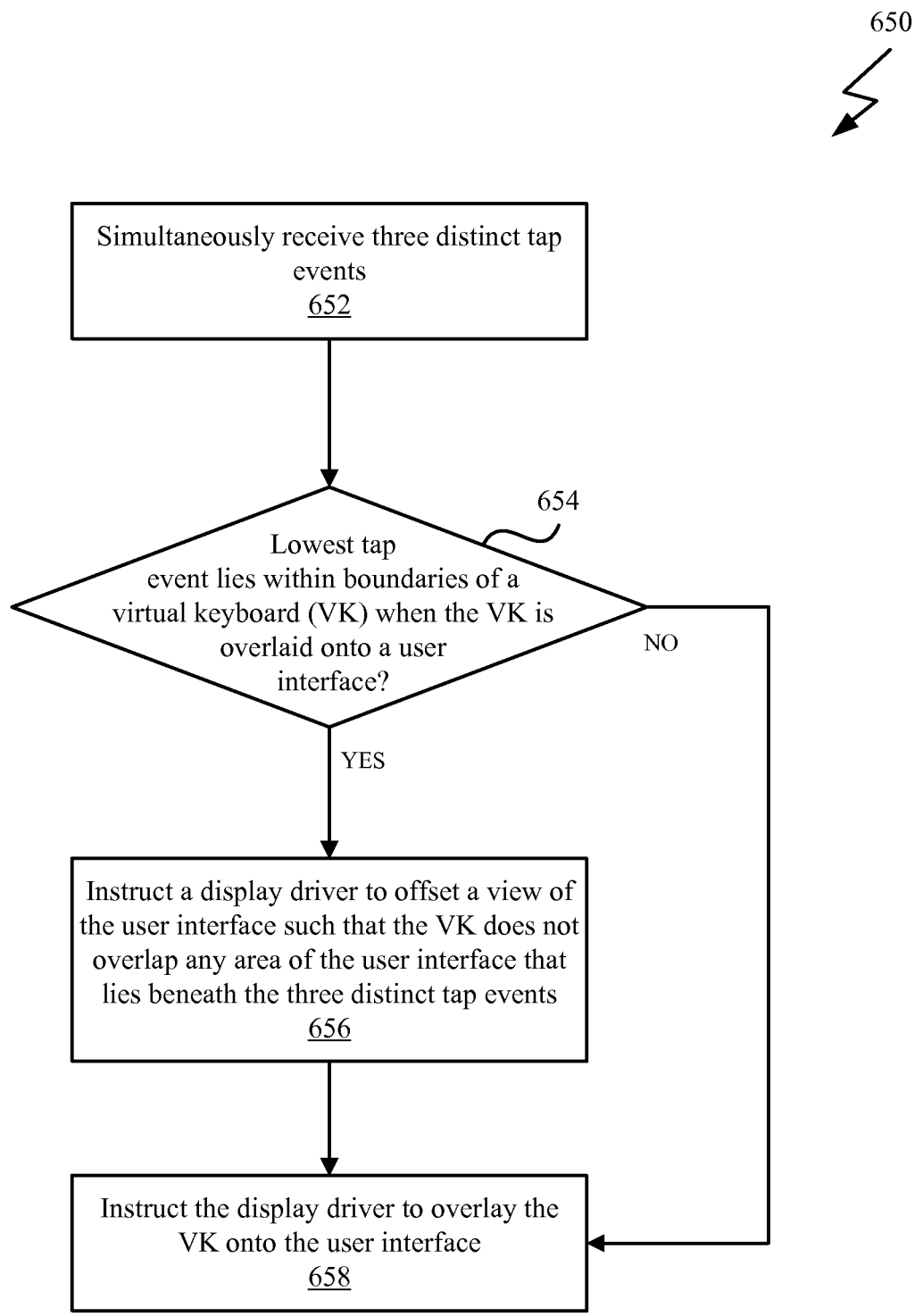
FIG. 6B is a flow diagram of method steps for maintaining visibility of a UI when auxiliary UI elements are overlaid onto the UI.

FIG. 6B is a flow diagram of exemplary method steps 650 for maintaining visibility of a UI when auxiliary UI elements are overlaid onto the UI. As shown, method 650 begins at step 652, where agent 138 simultaneously receives three distinct tap events, e.g., three taps 330. Again, agent 138 interprets the tap events by monitoring multi-touch display surface driver 134 and/or API 136. At step 654, agent 138 determines if the lowest tap event of three taps 330 lies within boundaries of virtual keyboard 608 when virtual keyboard 608 is overlaid onto UI 308. At step 656, agent 138 instructs multi-touch display surface driver 134 to offset a view of the exported graphical user interface (e.g., of the remote desktop) on UI 308 such that virtual keyboard 608 does not overlap any area of exported graphical user interface that lies beneath any of the three taps 330. At step 658, agent 138 instructs multi-touch display surface driver 134 to overlay virtual keyboard 608 onto UI 308.

Figure 7A:
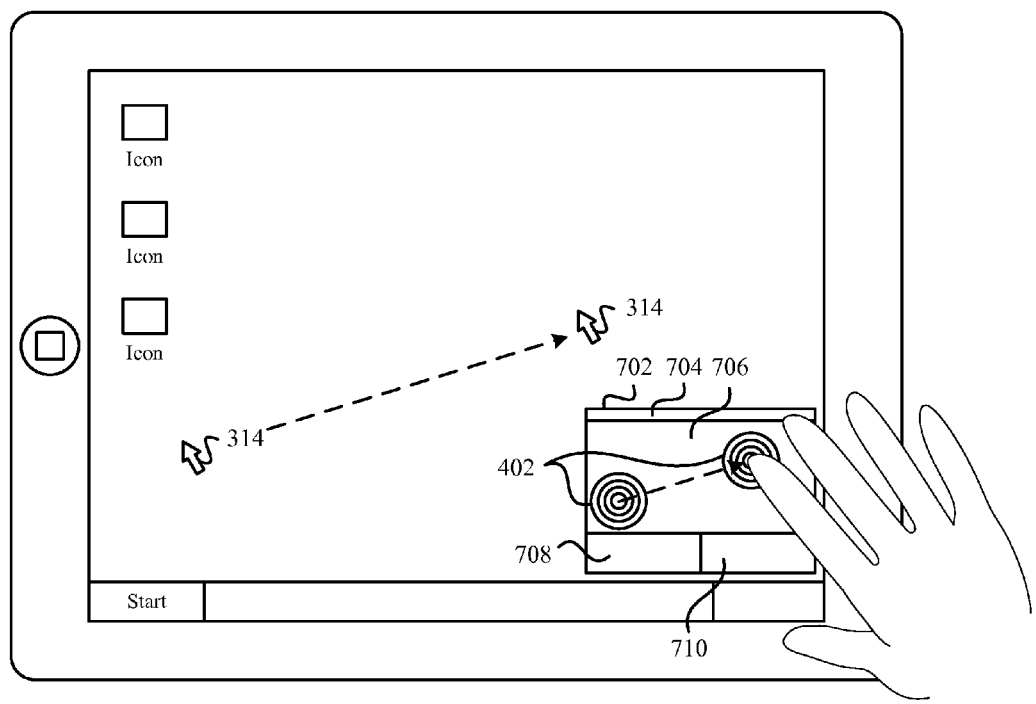
FIG. 7A is a conceptual diagram of a method for controlling a cursor using a virtual touch pad.

FIG. 7A is a conceptual diagram of a method for controlling a cursor using a virtual touch pad, according to one embodiment of the invention. As shown, agent 138 overlays a virtual touch pad 702 onto UI 308, where virtual touch pad 702 comprises a move handle 704, a touch area 706, a mouse left-click button 708, and a mouse right-click button 710. Virtual touch pad 702 may be configured to be semi-transparent so that any portion of UI 308 that lies beneath virtual touch pad 702 is not obstructed to the user. Handle 704 enables the user to adjust the location of virtual touch pad 702 within multi-touch display surface 132. For example, the user may establish press-and-hold 402 within the boundaries of handle 704 and, while maintaining contact with multi-touch display surface 132, drag his or her finger to relocate handle 704.

Touch area 706 may be used to control the location of cursor 314 within UI 308. For example, if the user establishes press-and-hold 402 within the boundaries of touch area 706 and, while maintaining contact with multi-touch display surface 132, drags his or her finger from left-to-right across touch area 706, cursor 314 is relocated in a similar fashion, as depicted. To enhance the operability of virtual touch pad 702, acceleration of movement across touch area 706 may be considered by agent 138. More specifically, the user may increase the rate of movement of cursor 314 by, for example, flicking his or her finger across touch area 706. In addition, touch area 706 may be configured to recognize taps 330 as mouse left-clicks.

Mouse left-click button 708 and mouse right-click button 710 may be used to perform mouse left-clicks and mouse right-clicks, respectively. For example, to perform a mouse left-click, the user would establish tap 330 within the boundaries of mouse left-click button 708. Similarly, to perform a mouse right click, the user would establish tap 330 within the boundaries of mouse right-click button 710. Mouse left-click button 708 and mouse right-click button 710 may also be reversed to provide operability to left-handed mouse users.

Figure 7B:
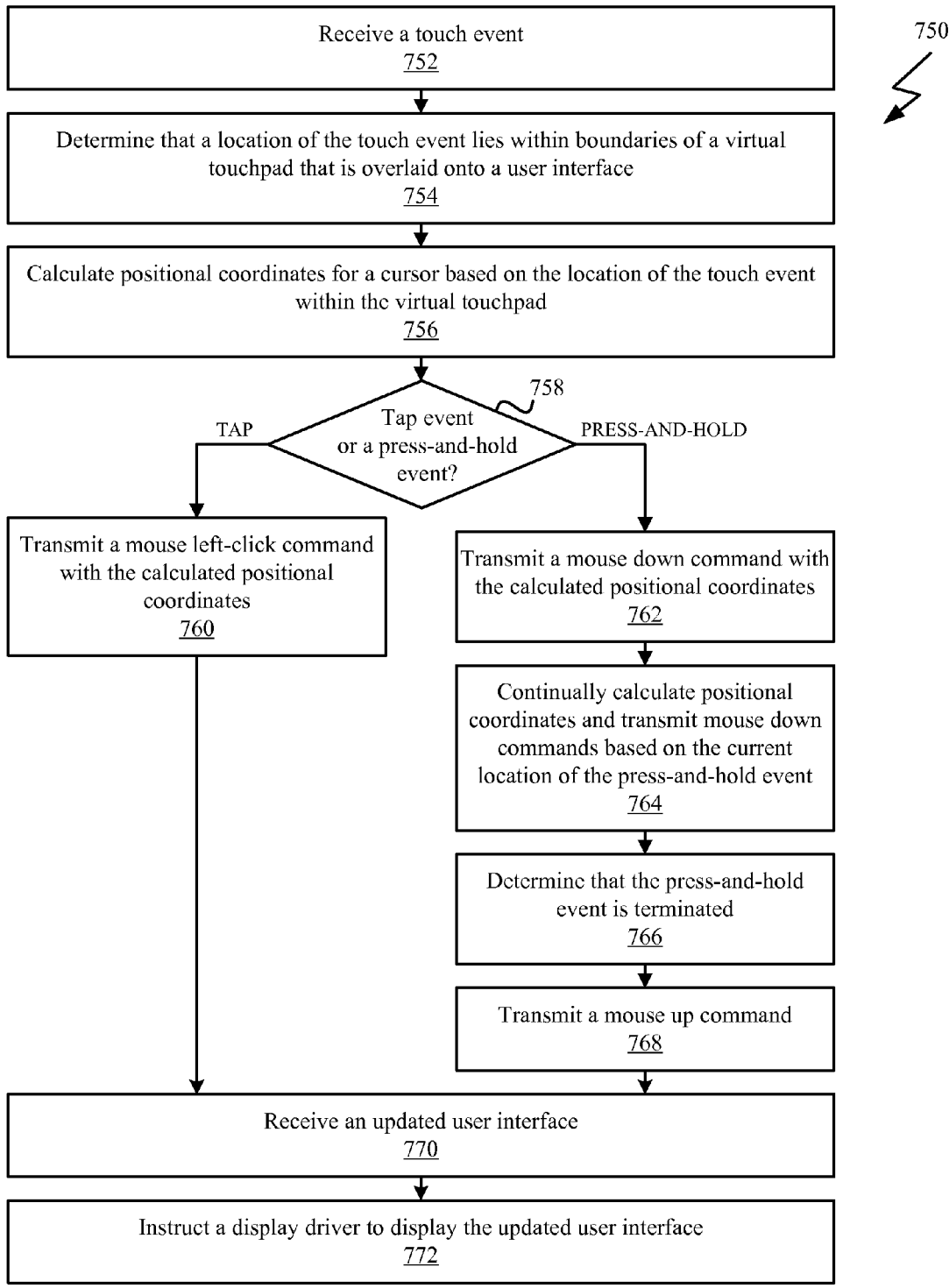
FIG. 7B is a conceptual diagram of method steps for controlling a cursor using a virtual touch pad, according to one embodiment of the present invention.

FIG. 7B is a flow diagram of method steps for controlling a cursor using a virtual touch pad, according to one embodiment of the present invention. As shown, method 750 begins at step 752, where agent 138 receives a touch event, e.g., tap 330 or press-and-hold 402. At step 754, agent 138 determines that a location of the touch event lies within boundaries of touch area 706 included in virtual touchpad 702. At step 756, agent 138 calculates positional coordinates for a cursor based on the location of the touch event within touch area 706. For example, if the touch event occurs at the bottom left corner of touch area 706, then the positional coordinates are set to a corresponding location at the bottom left corner of the UI displayed by multi-touch display surface 132.

At step 758, agent 138 determines whether the touch event is a tap event or a press-and-hold event. If, at step 758, agent 138 determines that the touch event is a tap event, then at step 760 agent 138 transmits a mouse left-click command with the positional coordinates calculated at step 756. At step 770, agent 138 receives an updated user interface. At step 772, agent 138 instructs a display driver to display the updated user interface.

Referring back now to step 758, if agent 138 determines that the touch event is a press-and-hold event, then at step 762 agent 138 transmits a mouse down command with the positional coordinates calculated at step 756. At step 764, agent 138 continually calculates positional coordinates and transmits mouse down commands based on the current location of the press-and-hold event. At step 766, agent 138 determines that the press-and-hold event is terminated. At step 768, agent 138 transmits a mouse up command. As described above, agent 138 continually issues instructions to the display driver to display an up-to-date UI that reflects inputs made by the user.

As described herein, embodiments enable remoting sessions between agent 138 and an operating system executing on host machine 110 and/or an application executing locally on computing device 130 to be highly configurable in order to support enhanced techniques for interacting with a mouse-and-keyboard based UI using a multi-touch display surface. The aforementioned database may be updated to support new gestures that perform particular mouse and/or keyboard based commands. In addition, the optional set of commands may be enhanced to reduce input requirements at the computing device 130, thereby increasing productivity and providing a better overall experience to the user.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of interpreting gestures made on a touch screen that is displaying a mouse-and-keyboard based user interface (UI), comprising:
   receiving a press-and-hold event in combination with a tap event in response to gestures made on the touch screen, wherein the press-and-hold event is detected in response to a user placing and holding a finger in contact with the touch screen beyond a first threshold amount of time, and wherein the tap event occurs after the press-and-hold event is detected;
   translating the received events to a mouse right-click command responsive to determining that the press-and-hold event in combination with the tap event was performed in less than a second threshold of time and determining that a location of the tap event is greater than a threshold distance from the location of the press-and-hold event;
   transmitting the mouse right-click command to an operating system; and
   receiving from the operating system, in response to the transmitted mouse right-click command, an updated mouse-and-keyboard based UI.

2. The method of claim 1, wherein the operating system is executing on a remote machine.

3. The method of claim 1, wherein the operating system is a guest operating system executing in a virtual machine.

4. The method of claim 1, wherein the updated mouse-and-keyboard based UI includes a display of a context menu at a location of the press-and-hold event.

5. A computing device comprising:
   a touch screen; and
   a processing unit configured to:
      receive a press-and-hold event in combination with a tap event in response to gestures made on the touch screen, wherein the press-and-hold event is detected in response to a user placing and holding a finger in contact with the touch screen beyond a first threshold amount of time, and wherein the tap event occurs after the press-and-hold event is detected;
      translating the received events to a mouse right-click command responsive to determining that the press-and-hold event in combination with the tap event was performed in less than a second threshold amount of time and determining that a location of the tap event is greater than a threshold distance from the location of the press-and-hold event;
      transmitting the mouse right-click command to an operating system; and
      receiving from the operating system, in response to the transmitted mouse right-click command, an updated mouse-and-keyboard based UI.

6. The computing device of claim 5, wherein the operating system is configured to execute on a remote machine.

7. The computing device of claim 5, wherein the operating system is a guest operating system executing in a virtual machine.

8. The computing device of claim 5, wherein the updated mouse-and-keyboard based UI includes a display of a context menu at a location of the press-and-hold event.

9. A non-transitory computer-readable medium storing instructions that, when executed by a processor, cause the processor to perform a method, the method comprising:
   receiving a press-and-hold event in combination with a tap event in response to gestures made on the touch screen, wherein the press-and-hold event is detected in response to a user placing and holding a finger in contact with the touch screen beyond a first threshold amount of time, and wherein the tap event occurs after the press-and-hold event is detected;
   translating the received events to a mouse right-click command responsive to determining that the press-and-hold event in combination with the tap event was performed in less than a second threshold amount of time and determining that a location of the tap event is greater than a threshold distance from the location of the press-and-hold event;
   transmitting the mouse right-click command to an operating system; and
   receiving from the operating system, in response to the transmitted mouse right-click command, an updated mouse-and-keyboard based UI.

10. The non-transitory computer-readable medium of claim 9, wherein the operating system is executing on a remote machine.

11. The non-transitory computer-readable medium of claim 9, wherein the operating system is a guest operating system executing in a virtual machine.

12. The non-transitory computer-readable medium of claim 9, wherein the updated mouse-and-keyboard based UI includes a display of a context menu at a location of the press-and-hold event.

* * * * *